United States Patent Office 3,145,084
Patented Aug. 18, 1964

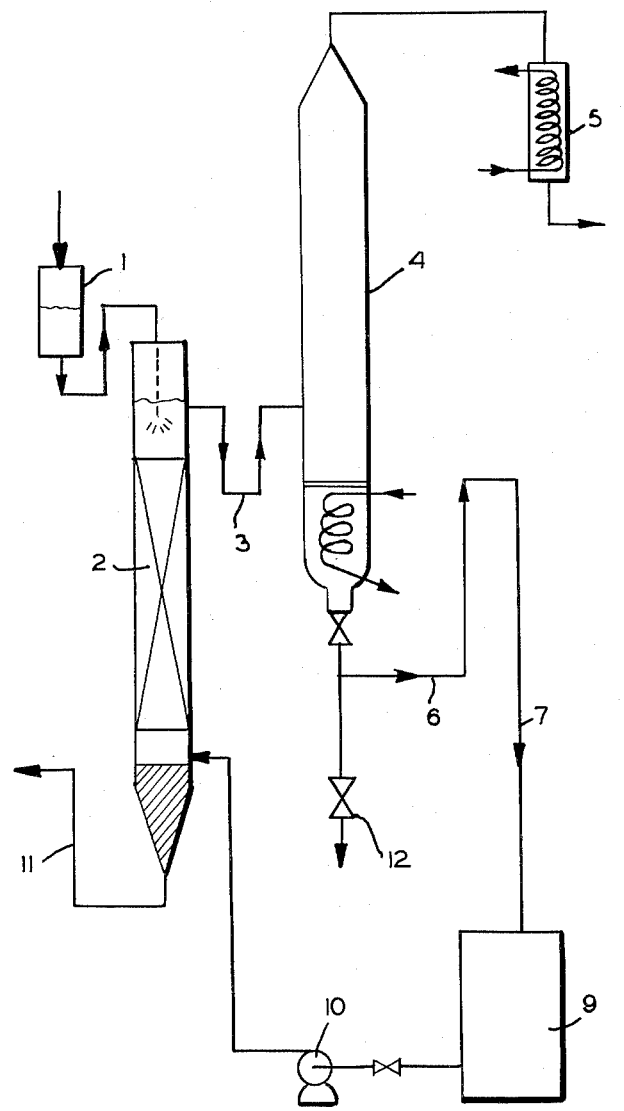

3,145,084
PURIFICATION OF LIQUID BROMINE CONTAMINATED WITH ORGANIC IMPURITIES
Leo Rudolf Belohlav, Lafayette, Ind., assignor to Great Lakes Chemical Corporation, West Lafayette, Ind., a corporation of Michigan
Filed Feb. 6, 1963, Ser. No. 256,607
6 Claims. (Cl. 23—216)

This invention relates to a novel method for the purification of bromine.

Impure or recovered bromine may contain organic compounds, carbon dioxide, chloride and other undesirable contaminants. These contaminants may interfere with the proposed chemical reactions in which the bromine is to be a reactant or they may form residues or corrode the equipment in which they are employed. It is the object of the present invention to free bromine from those contaminants which would not be removed by ordinary distillation procedures.

The invention sought to be patented resides in the concept of a process for the purification of bromine contaminated with organic impurities which comprises the steps of mixing the contaminated bromine as a liquid with an amount of a 5 to 30 percent aqueous solution of a bromide which dissolves less than all of the contaminated bromine, separating the resulting aqueous phase from the undissolved bromine, and heating the separated aqueous phase to volatilize the bromine dissolved therein and condensing and recovering the thus-purified liquid bromine.

The manner and process of using this invention is illustrated by the following general description and examples, which set forth the best mode contemplated by me of carrying out the invention so as to enable any person skilled in the art of chemistry to make and use the same.

The present process makes use of the well known fact that aqueous solutions of bromides are capable of forming complexes with elemental bromine. The complex is in the form of a complex anion which is disassociated on heating. While all aqueous bromide solutions are useful in the process of my invention, solutions of alkali and alkaline earth metals are preferred. Hydrobromic acid and water-soluble quaternary ammonium bromides may also be used as the source of the bromide anion.

In the operation of my process, the contaminated or impure bromine is intimately contacted, i.e., extracted, with an aqueous bromide solution. The system must contain sufficient bromine or be sufficiently dilute in bromide to allow separation into two phases. While there is no theoretical lower limit as to the amount of bromide that need be present in the aqueous phase, for practical reasons, solutions containing more than 5 percent by weight of bromide should be employed and solutions containing more than 15 percent by weight of bromide are preferred. It is necessary to keep the bromide concentration below 30 percent by weight since above this concentration the aqueous phase will contain a sufficiently high amount of complexed elemental bromine to exhibit a significant solubility for the organic contaminants.

After the bromine being purified and the bromide-containing extractant have been stirred together or otherwise intimately mixed, the two liquid phases are separated. The bromine phase may be further extracted or may be returned to the body of liquid bromine undergoing the purification treatment. Heating of the aqueous phase drives off bromine and some water. Condensation of the thus purified bromine is aided by cooling and the bromine is dried in any conventional manner. The residual bromide-containing aqueous phase can be recycled and reused for the further extract of additional impure bromine.

The success of the present purification process is attributed to the fact that only bromine can form complexes with bromide. The organic contaminants present in the bromine being purified remain in the bromine or non-extracted phase since they are essentially insoluble in the aqueous phase. Any elemental chlorine that may be present is reduced by bromide to chloride. Such chloride and any other chloride that may be present remains soluble in the aqueous phase.

The following examples are offered to illustrate further means by which the process of the present invention may be used to produce pure bromine and are not intended to limit the scope of the invention:

Example 1

One hundred milliliters of crude bromine, containing carbon dioxide and organic impurities as determined by its infra red spectrum in a 1 cm. sodium chloride cell, was intimately mixed with an equal volume of a solution containing approximately 8.3 and 28.5 percent by weight of sodium bromate and sodium bromide, respectively. On standing, the mixture separated into a 122 milliliter aqueous phase and a 77 milliliter bromine phase. The aqueous phase containing the bromide-bromine complex was heated until the residual liquid was pale yellow, indicating the substantially complete release of bromine. The bromine thus distilled, was collected and dried with sulfuric acid. Comparative infrad red analysis indicated the substantial absence of all impurities, other than water, present in the initial 100 milliliter sample of crude bromine.

The residue bromine from the first extraction was intimately mixed with the recovered bromide solution obtained by driving off the purified bromine. The system separated into a 120 milliliter aqueous phase and a 54 milliliter bromine phase. Distillation of the aqueous phase gave purified bromine as above. Two additional extractions of the residual crude bromine gave substantially the same results as summarized in the following table:

[All volumes are in milliliters]

| Extraction | Volume before extraction | | Volume after extraction | | Volume after distillation | |
|---|---|---|---|---|---|---|
| | Crude bromine | Bromide solution | Crude bromine | Bromide solution | Purified bromine | Recovered bromide |
| 1st | 100 | 100 | 77 | 122 | 20 | 99 |
| 2nd | 77 | 99 | 54 | 120 | 20 | 98 |
| 3rd | 54 | 98 | 32 | 119 | 21 | 97 |
| 4th | 32 | 97 | 9 | 118 | 21 | 98 |

To test the efficiency of the purification process, infrared spectra of bromine containing known amounts of organic contaminants were run. Using these spectra as standards, the bromine purified according to the process of the present invention was found to contain less than ten parts per million of organic contaminants. The residue after the fourth extraction, representing approximately 9 percent of the total bromine purified, was dried and analyzed. It was found to contain substantially all of the impurities originally present in the crude bromine purified.

*Example 2*

Using the general procedure of the previous example, 100 milliliters of crude bromine was extracted with an equal volume of an aqueous sodium bromide solution having a density of 1.18 (approximately 23 percent by weight of sodium bromide). A 118 milliliter aqueous phase and an 81 milliliter bromine phase resulted on separation. Analysis of the bromine recovered from distillation of the aqueous phase demonstrated a significant increase in purity. Solutions of lithium bromide, potassium bromide, calcium bromide and barium bromide can be used in place of the sodium bromide solution.

*Example 3*

Using the general procedure of Example 2, 130 milliliters of crude bromine was extracted with 100 milliliters of aqueous hydrobromic acid having a density of 1.213. On separation 80 milliliters of residual bromine and 148 milliliters of an aqueous phase were obtained. Distillation of the aqueous phase gave 45.5 milliliters of purified bromine.

The effectiveness of the described purification method in the removal of chlorine was also determined. The chlorine content of the bromine was determined argentometrically before and after purification. Before purification, the bromine contained 109 parts per million of chlorine; after purification, the bromine contained less than 5 parts per million of chlorine.

The process of my invention can be readily adapted to a continuous process as illustrated in the drawing and by means of the following description: Crude, undried bromine, taken from the manufacturing process contained significant amounts of organic compounds, even though it had already been subjected to the fractionation and distillation procedures of normal commercial bromine production. This bromine containing less than 0.3 percent chlorine and having a total assay of better than 99 percent was fed via surge vessel 1 into the upper portion of extractor 2. Bromide solution from surge tank 9 is passed by means of pump 10 to the lower portion of extractor 2 which is designed to provide intimate contact between the down flowing bromine and the up flowing bromide solution. The flow of bromine and bromide solution through the extractor is regulated such that up to 10 percent (depending on the quality of input bromine) of the total amount of bromine entering the extractor passes through the reactor uncomplexed and is withdrawn through the overflow line 11 and passed to a suitable reclaiming operation. The bromide solution saturated with elemental bromine flows via line 3 into the stripping column 4 where the purified bromine is driven off by heating. The volatilized bromine is condensed in the heat exchanger 5 and is subsequently dried. The bromide solution depleted of bromine flows through the lines 6 and 7 into the surge vessel 9 from which it is pumped by the recycle pump 10 back to the extractor 2.

The length of time the bromide solution can be recirculated depends on the chlorine content of the feed bromine exclusively. In the process of removing chlorine by reduction to chloride, the bromide ion concentration in the bromine solution will gradually decrease and with it the solubility for elemental bromine. Practical considerations make it desirable to maintain the extraction efficiently and, accordingly, means are provided to draw off continuously or intermittently bromide solution from the recirculating brine stream. The removal can be accomplished by opening the valve 12 and transferring part of the depleted bromide solution to suitable reclaiming operations.

In a preferred aspect of my process, a make-up liquid consists of about 13.7 percent aqueous caustic which is added to the surge vessel 9 as required. Upon contact with elemental bromine in the extractor 2, the diluted caustic will react according to the equation:

$$2NaOH + Br_2 \rightarrow NaBr + NaOBr + H_2O$$

The moderate heat evolution during this reaction of the diluted caustic will not be sufficient to cause complete disproportionation according to:

$$3NaOBr \rightarrow NaBrO_3 + 2NaBr$$

Final conversion of the hypobromite to bromate and bromide takes place subseqently in the stripping column 4.

The foregoing description is for the purpose of illustration only and the scope of my invention is to be limited only by the appended claims.

I claim:
1. A process for increasing the purity of liquid bromine contaminated with organic impurities which comprises the steps of
    (1) mixing the contaminated bromine as a liquid with an amount of a 5 to 30 percent aqueous solution of a bromide which dissolves less than all of the contaminated bromine to produce a two phase system consisting of undissolved contaminated bromine containing most of the organic contaminants and an aqueous phase containing bromine dissolved therein,
    (2) separating the aqueous phase from the undissolved contaminated bromine,
    (3) heating the separated aqueous phase to volatilize the thus-purified bromine dissolved therein, and
    (4) condensing and recovering the thus-purified liquid bromine.
2. A process according to claim 1 wherein the bromide is sodium bromide.
3. A continuous process for increasing the purity of liquid bromine contaminated with organic impurities which comprises the steps of
    (1) passing the contaminated bromine as a liquid in countercurrent relationship with an amount of a 5 to 30 percent aqueous solution of a bromide which dissolves at least 90 percent but less than all of the bromine to produce a two phase system consisting of undissolved contaminated bromine containing most of the organic contaminants and an aqueous phase containing bromine dissolved therein,
    (2) separating the resulting aqueous phase from the undissolved contaminated bromine,
    (3) heating the separated aqueous phase to volatilize the bromine dissolved therein,
    (4) cooling the heated bromine-free aqueous phase, and
    (5) passing the cooled aqueous phase in countercurrent relationship with additional contaminated liquid bromine.
4. Process according to claim 3 wherein the bromide is sodium bromide.
5. Process according to claim 3 wherein a portion of the separated bromine-free aqueous phase is replaced with aqueous sodium hydroxide to maintain, by reaction with the bromine upon mixture therewith to produce NaBr and NaOBr, the bromide ion concentration in the bromide solution.
6. A continuous process for increasing the purity of liquid bromine of at least 99 percent purity but contaminated with organic impurities which comprises the steps of
    (1) passing the contaminated bromine as a liquid in countercurrent relationship with an amount of a 15 to 30 percent aqueous solution of sodium bromide which dissolves at least 90 percent but less than all of the contaminated bromine to produce a two phase system consisting of undissolved contaminated bromine containing most of the organic contaminants and an aqueous phase containing bromine dissolved therein,
    (2) separating the aqueous phase from the undissolved contaminated bromine,
    (3) heating the separated aqueous phase to volatilize the bromine dissolved therein,

(4) condensing and recovering the volatilized bromine,
(5) cooling the resulting bromine-free aqueous phase,
(6) replacing a portion of the bromine-free aqueous phase with aqueous sodium hydroxide to maintain, by reaction with the bromine upon mixture therewith to produce NaBr and NaOBr, the bromide ion concentration in the bromide solution,
(7) passing the combined bromine-free aqueous phase and aqueous sodium hydroxide in counter current relationship with additional contaminated bromine.

References Cited in the file of this patent

UNITED STATES PATENTS

| | | |
|---|---|---|
| 733,467 | Dow | July 14, 1903 |
| 1,085,944 | Schaefer | Feb. 3, 1914 |
| 2,784,063 | Block et al. | Mar. 5, 1957 |

FOREIGN PATENTS

| | | |
|---|---|---|
| 382,512 | Great Britain | Oct. 27, 1932 |